Feb. 12, 1957 W. A. INMAN 2,780,876
APPARATUS FOR DRYING BULK GRAIN
Filed March 31, 1955 3 Sheets-Sheet 1
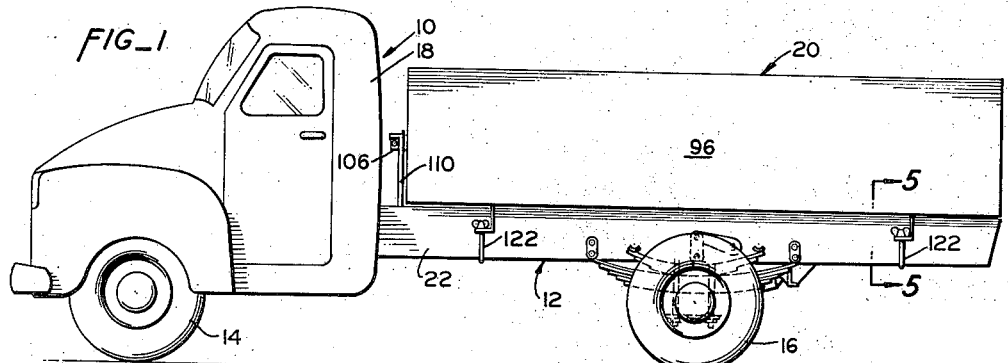
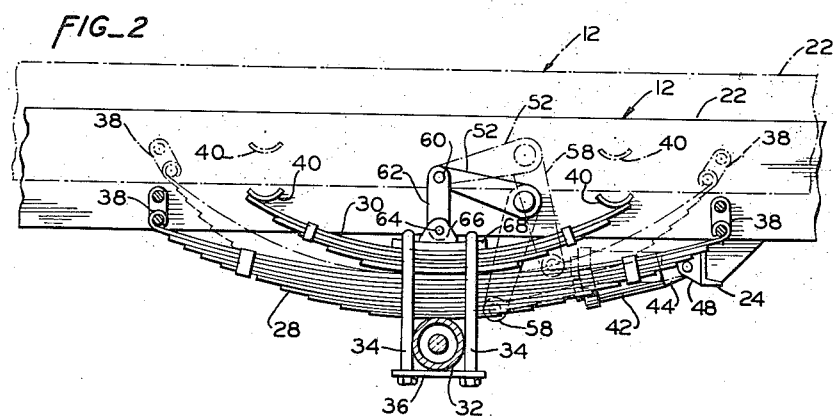
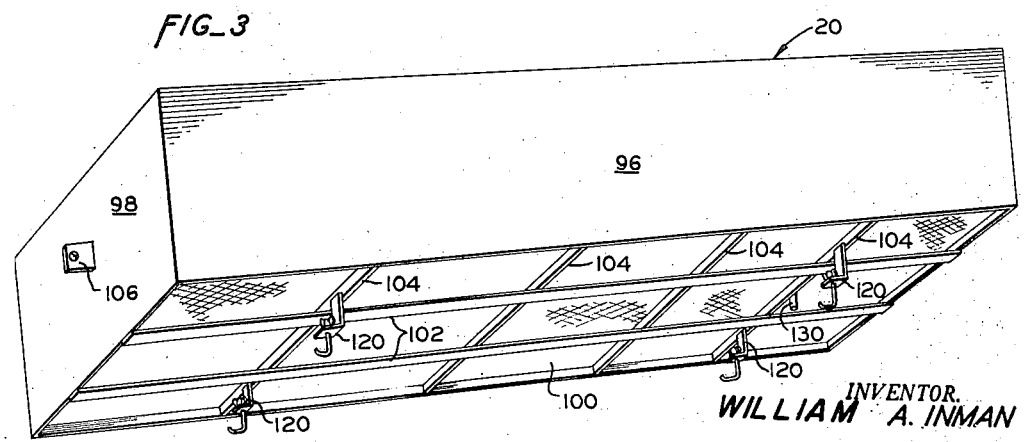
INVENTOR.
WILLIAM A. INMAN
BY
*Naylor & Neal*
ATTORNEYS

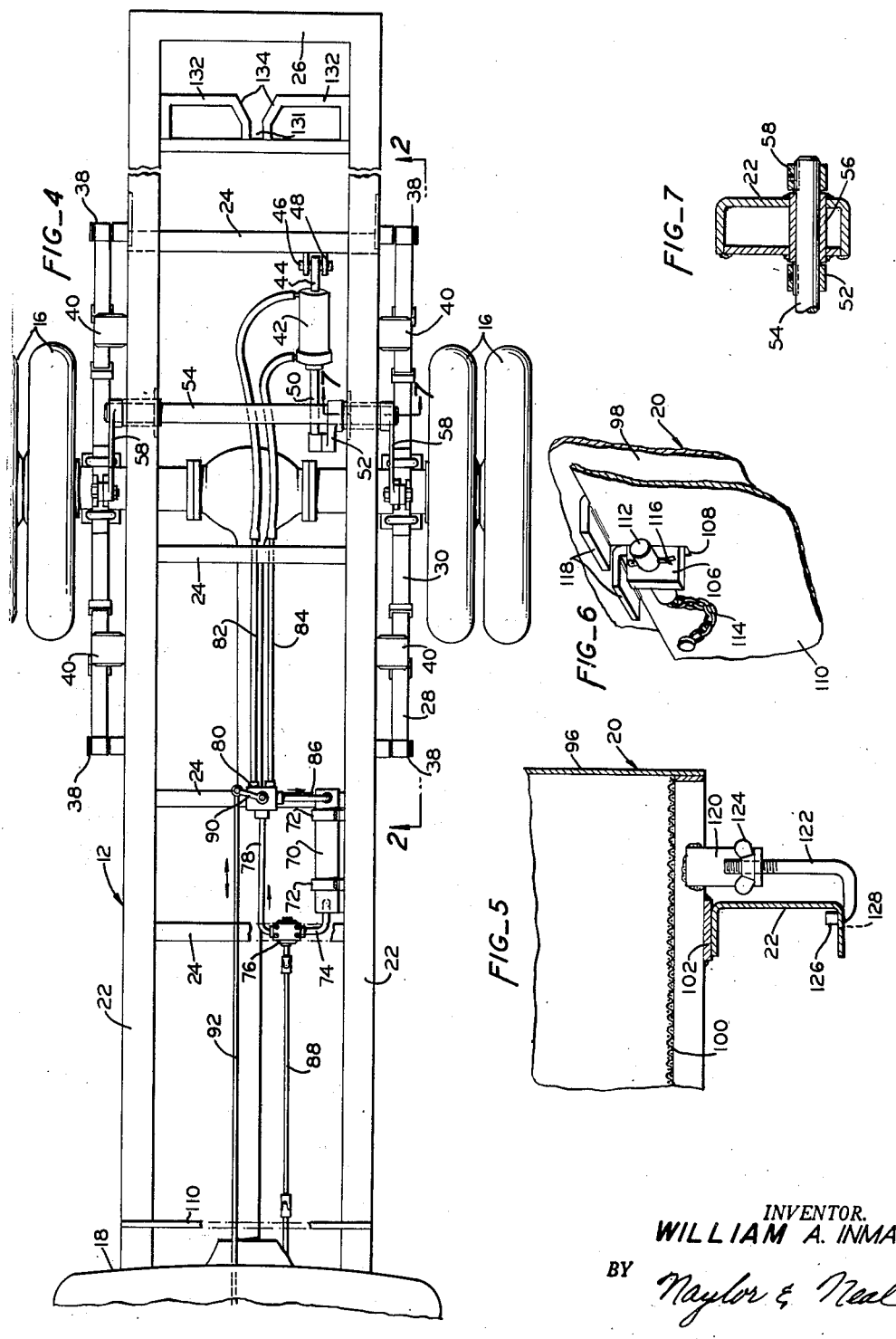

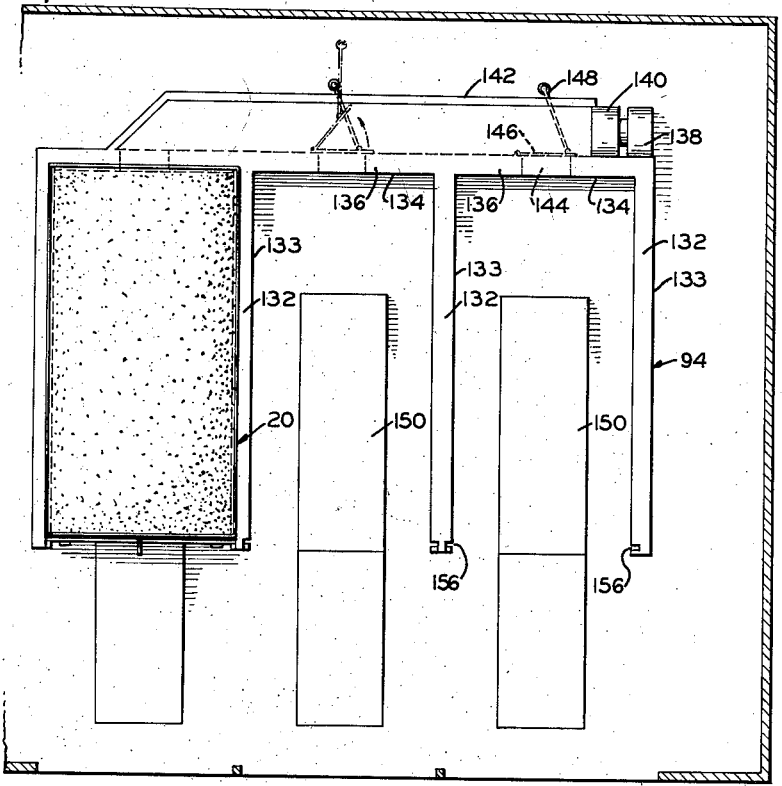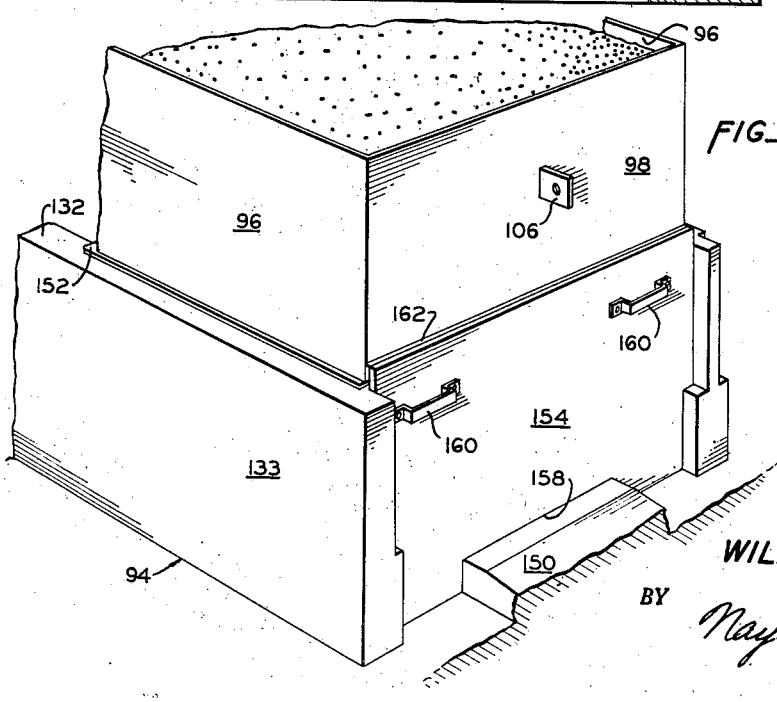

United States Patent Office 2,780,876
Patented Feb. 12, 1957

2,780,876
APPARATUS FOR DRYING BULK GRAIN
William A. Inman, Oroville, Calif.

Application March 31, 1955, Serial No. 498,348

2 Claims. (Cl. 34—90)

This invention relates to bulk grain drying, and more particularly to apparatus, including means for transporting the grain from the crop fields to the site of drying, for effecting the drying of the grain with a minimum of handling thereof.

The essential object of the invention is the provision of bulk grain drying apparatus comprising one or more three-sided open-topped enclosures, means associated therewith including a burner and a conduit interconnecting the burner with the enclosure to deliver heated air into the enclosure, a truck adapted to collect grain and to transport it to an enclosure, said truck being provided with a truck bed having a perforate bottom, and said truck embodying means for removing the truck bed from the truck chassis and depositing the same over the enclosure and for removing the truck bed from the enclosure and replacing it upon the truck chassis, and means provided in association between the truck bed and enclosure for providing a substantially air tight connection between the upper periphery of the enclosure and the bottom of the truck bed, whereby heated air delivered to the enclosure is channeled upwardly through the perforate bottom of the truck bed and caused to dry the grain in said bed.

This and other objects and advantages of the invention will be apparent from the following description taken in conjunction with the drawings forming part of this specification, and in which:

Figure 1 is a view in side elevation of a truck embodying, in part, the invention;

Figure 2 is an enlarged detail view in side elevation illustrating the means for raising the truck chassis for the placement of the truck bed upon the fixed enclosure portion of the dryer system;

Figure 3 is a view in perspective of the truck bed;

Figure 4 is a plan view of the truck chassis, with the truck bed removed therefrom, showing the chassis lifting means and the control means therefor;

Figure 5 is an enlarged detail view taken along lines 5—5 of Figure 1;

Figure 6 is an enlarged detail view in perspective of the forward point of connection between the truck bed and chassis;

Figure 7 is a detail view in section taken along lines 7—7 of Figure 4;

Figure 8 is a plan view of the bulk grain dryer system showing a grain-loaded truck bed in place over one of the enclosures thereof; and Figure 9 is a view in perspective of the grain dryer system, illustrating a removable door for the forward end of the enclosure adapted to complete the sealing off of the enclosure space with respect to a loaded truck bed.

With reference to the drawings, the truck 10 forming part of the subject apparatus is comprised of: a chassis 12 mounted on front and rear wheels 14 and 16; a cab 18 positioned on the forward end of the chassis; and an open-topped box-like truck bed 20 removably carried by chassis 12. The chassis 12 is comprised of a pair of parallel rails 22 tied together by a plurality of cross members 24 and an end rail 26. The chassis is connected to the rear wheels 16 for support thereby by means of a pair of primary leaf spring assemblies 28 and a pair of secondary, or over load, spring assemblies 30, said assemblies being centrally supported on housings 32 of the axle assembly for the rear wheels and being secured thereto by pairs of U-shaped hanger clamps 34 having their lower ends secured to tie plates 36 abutting the undersides of the axle housings 32. The primary springs 28 are end connected to shackles 38 which are secured to rails 22, while the ends of the over load spring assembly 30 engage beneath arcuate lugs 40 which are likewise secured to rails 22.

Means are provided in association with the chassis to raise the same, for a purpose hereinafter made apparent, relative to axle housings 32, said means comprising: a two-way acting hydraulic cylinder 42 having at one end thereof a mounting tongue 44 pivotally secured to a chassis cross member 24 by a pin 46 extending through a pair of ears 48 secured to the cross member and the tongue 44, said cylinder 42 having a piston rod 50 extending from the other end thereof; a lever arm 52 laterally offset from piston rod 50 but fixedly secured thereto; a shaft 54 extending transversely of the chassis and journalled in bearing sleeves 56 fixedly carried by rails 22, said arm 52 having its other end fixedly secured to shaft 54, as shown in Figure 7; a pair of lever arms 58 having like ends thereof fixedly secured to shaft 54, as shown in Figure 7, and having their other ends pivotally attached at 60 to the upper ends of links 62 which are secured, as at 64, to ears 66 carried by plate 68, said plate 68 being clamped to the spring assembly by means of the hanger clamps 34.

The control system for the hydraulic cylinder 42 comprises: a fluid sump 70 attached, as by clamps 72, to one of the rails 22; and an outlet conduit 74 interconnecting the sump 70 with a pump 76 mounted on one of the chassis cross members 24; a conduit 78 interconnecting the output side of pump 76 with the input side of a multiple-way valve 80; a conduit 82 interconnecting valve 80 with the rearward end of cylinder 42; a conduit 84 interconnecting the valve 80 with the forward end of cylinder 42; a conduit 86 interconnecting the valve 80 with the inlet side of sump 70; a drive shaft 88 interconnecting pump 76 with the truck motor, not shown; and a control system for valve 80 comprising lever 90 and control rod 92 interconnecting said lever 90 with immediate manual control means, not shown, disposed in cab 18.

Under normal conditions the chassis 12 is in a load-depressed position, such as is indicated in the solid outline showing in Figure 2. When the chassis is in this position, the cylinder 42 and the related rod and lever assembly are in the position indicated in solid outline in Figure 2. When it is desired to lift the chassis relative to the rear wheels 16 and axle housings 32 in opposition to the load carried by the chassis, valve rod 92 is actuated to move valve control lever 90 to interconnect conduit 78 with conduit 84 and to interconnect conduit 82 with conduit 86, thereby connecting the rearward end of cylinder 42 to the inlet end of sump 70 and to connect the forward end of cylinder 42 to the outlet end of the sump 70 through pump 76. Resultant movement inwardly of the cylinder 42 of piston rod 50 causes lever arms 52 and 58 to be mutually rotated in a counter-clockwise direction about pivot point 60 to thereby raise shaft 54 upwardly, and upward movement of the shaft imparts a corresponding upward movement of the chassis.

When the valve lever 90 is thereafter moved to its oppositely extreme position, conduit 82 is connected to conduit 78 and conduit 84 is connected to conduit 86, and thus piston rod 50 is forced outwardly to positively return the rod and associated lever assembly to the dotted line position shown in Figure 2. When lever 90 is in a neutral position, the pump 76 merely circulates fluid through conduits 74, 78 and 86.

Such forced upward movement and attenuated, or cushioned, return movement of chassis 12 is utilized to place the truck bed 20 on top of one of the enclosures 94 and to remove the truck bed therefrom.

The truck bed 20 is comprised of side walls 96, end walls 98, a perforate bottom wall 100, a pair of parallel rail members 102 adapted to engage chassis rails 22, and a plurality of transverse reinforcement members 104. The forward end wall of the bed is provided with an apertured tongue member 106 which normally extends through a slot 108 formed in a vertically disposed plate 110 fixedly secured to the chassis. A locking bolt 112 attached to plate 110, as by chain 114, is normally disposed within the aperture of the bed tongue 106 and secured against removal therefrom, as by a removable cotter key 116. The plate 110 is provided with forwardly extending ears 118 adapted to prevent vertical removal of the tongue 106 from slot 108 when the pin 112 is in place.

The bed 20 is further provided with two pair of angle brackets 120 secured to cross members 104, with the horizontally disposed portions of said brackets being apertured to receive substantially J-shaped tie members 122. The upper end of said tie members have wing nuts 124 in threaded engagement therewith, and the upturned lower ends 126 of said tie members are adapted to be received within apertures 128 formed in the lower side of rails 22. When the ends 126 of tie members 122 are disposed within the rail apertures 128 and wing nuts 124 are in a tightened condition, said tie members together with the tongue and pin 106, 112 connection between the bed and the chassis serve to firmly connect the bed to the chassis. The underside of the bed is further provided with a dependent pin 130 which is disposed within the space 131 between box frame members 132 secured to the chassis at the rearward end thereof. The box spring members 132 are further provided with angled surfaces 134 for a purpose hereinafter described.

The enclosures 94, shown in Figure 8 as being three in number, comprise side walls 133 having horizontally disposed upper surfaces 132 and rear walls 134 having horizontally disposed upper surfaces 136 which are coplanar with respect to side wall surfaces 132. Means comprising a burner 136, a blower 140, an air tunnel 142, openings 144 formed in the rear walls 134, doors 146 pivotally associated with the openings 144, and control rods 148 extending outwardly of tunnel 142 and adapted to be employed to adjustably position the doors 146, serve to selectively direct a desired amount of heated air into one or more of the enclosures 94. The enclosures 94 are further provided at the bottom thereof with centrally disposed curbs 150 adapted to serve as guides for the rear wheels 16 of the truck as the truck is backed in to an enclosure.

After the truck bed 20 has been filled with grain to be dried, such as corn, the truck is backed into alignment with one of the enclosures. The chassis and bed are then raised, as above described, to a point where the bottom of the truck bed is disposed slightly above the top surfaces 132 and 136 of the walls of the enclosures. After then unfastening the bed to chassis connections comprising the tie members 122, the truck is backed within an enclosure to a point where the rearward edge of the truck bed is disposed above the surface 136 of the rear wall 134. The control mechanism for the cylinder 42 is then actuated, as above described, to gently lower the truck bed onto the surfaces 132 and 136 following which the truck is driven out of the enclosure.

Means are provided in association between the enclosure and the truck bed to constrain the heated air delivery to the enclosure to move upwardly through the perforate bottom 100 of the truck bed and through the grain within the bed, said means comprising: rubber strips 152 secured to surfaces 132 and 136 and adapted to laterally and rearwardly seal off the enclosure space with respect to the truck bed; and a removable door 154 adapted to be received within opposed slots 156 formed in the enclosure walls 130, said door 154 being provided with a clearance slot 158 for curb 150, being provided with handles 160 for manual handling, and being provided with a rubber sealing strip 162 adapted to engage the forward wall 98 of the truck bed.

When the grain within the bed has been dried, the enclosure door 154 is removed and the truck is again backed into the enclosure. The backing of the truck is continued until the pin 130 carried by the truck bed is disposed fully within the space 131 between the box frame attachments 132. Surfaces 134 of the box frame attachments serve, in effect, as camming surfaces to guide pin 130 into space 131. The chassis is then raised to lift the truck bed out of engagement with the enclosure walls, following which the locking pin 112 is inserted in the truck bed tongue 106. The truck is then driven out of the enclosure, and the tie members 122 are then engaged with the chassis rails 122. The chassis and bed are then lowered to their normal position.

It will be appreciated that the particular enclosures not being immediately employed for grain drying purposes may be utilized as the supporting means for additional and empty truck beds. Thus, when the truck has deposited a loaded truck bed over one enclosure for drying, it may be then moved into one of the other enclosures to pick up an empty bed and transport the empty bed to the crop field to be filled with grain. After then placing the filled truck bed over an enclosure, the truck may then be employed to remove the bed containing dried grain and to transport the dried grain to the point of storage or sale.

It will thus be appreciated that the grain drying apparatus of the invention enables the gathering, drying and selling of the grain with a minimum of handling, it being necessary to only load the grain into the truck bed in the first instance and to empty the truck bed at the point of sale.

While a specific embodiment of the apparatus of the invention has been shown and described, it is to be understood that all substantial equivalents thereof are considered to be within the spirit and scope of the invention.

What is claimed is:

1. Apparatus of the class described comprising a truck having a chassis mounted on a rear wheel and axle assembly, a box-like bed having a perforated bottom wall, means for removably connecting said bed to said chassis, an open-topped fixed enclosure having side walls and a rear wall, said side and rear walls having horizontally extending and co-planar upper surfaces disposed at a level higher than the normal level of the underside of said bed, said side walls being spaced apart a distance greater than the width of said chassis and wheel and axle assembly but less than the width of said bed, means for effecting a removal of said bed from said chassis and for placing said bed over said enclosure in supported engagement with said side and rear walls comprising means carried by said chassis for controllably raising said bed above the upper surfaces of said side and rear walls and for lowering said bed onto said wall surfaces, means for introducing heated air into said enclosure, means for constraining said air to pass upwardly through the perforate bottom wall of said bed comprising sealing means in association with said bed and said side and rear walls, and a removable door disposed in closing relation to the forward end of said enclosure and in air sealing contact with said bed.

2. Apparatus as set forth in claim 1, said chassis being supportably connected to said wheel and axle assembly by leaf spring assemblies, whereby said bed and chassis are urged progressively closer to said wheel and axle assembly against the yielding action of said spring assemblies in proportion to the load carried by said bed, with the underside of said bed, when said bed is empty, being disposed at a level slightly above that of the upper surfaces of said enclosure walls, and with the underside of said bed, when said bed is substantially fully loaded, being disposed at a level below that of the upper surfaces of said enclosure walls, said means for controllably raising and lowering said bed comprising a two-way acting hydraulic cylinder pivotally attached to the chassis and having a piston arm pivotally connected to one end of a crank lever assembly, said crank lever assembly having a pivotal fulcrum connection between the other end thereof and the mid-portions of said spring assemblies above the latter, said crank lever assembly having an intermediate connection with said chassis, whereby movement in one direction of said piston arm causes said crank lever assembly to raise said chassis and bed relative to said wheel and axle assembly and movement of said piston arm in the other direction causes said crank lever assembly to lower said chassis and bed to be resiliently supported by said spring assemblies.

References Cited in the file of this patent

UNITED STATES PATENTS

| | | |
|---|---|---|
| 1,175,545 | Morgan | Mar. 14, 1916 |
| 2,379,094 | Maxon | June 26, 1945 |
| 2,681,811 | Green | June 22, 1954 |
| 2,704,021 | Brundage | Mar. 15, 1955 |
| 2,714,258 | Smith et al. | Aug. 2, 1955 |

FOREIGN PATENTS

| | | |
|---|---|---|
| 1,048,018 | France | July 29, 1953 |